United States Patent
Cok et al.

(10) Patent No.: US 8,514,246 B2
(45) Date of Patent: **\*Aug. 20, 2013**

(54) METHOD FOR IMAGE RENDERING IN A COMPUTER NETWORK

(75) Inventors: Ronald S. Cok, Rochester, NY (US); Peter K. Traeg, Rochester, NY (US); Peter W. Hoppner, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 565 days.

This patent is subject to a terminal disclaimer.

(21) Appl. No.: 12/827,331

(22) Filed: Jun. 30, 2010

(65) Prior Publication Data

US 2012/0001935 A1 Jan. 5, 2012

(51) Int. Cl.
*G09G 5/00* (2006.01)

(52) U.S. Cl.
USPC .......... 345/619; 345/582; 345/428; 382/305; 715/764; 715/765; 709/203; 709/246

(58) Field of Classification Search
None
See application file for complete search history.

(56) References Cited

U.S. PATENT DOCUMENTS

| 6,577,311 | B1 | 6/2003 | Crosby et al. |
| 6,665,838 | B1 | 12/2003 | Brown et al. |
| 6,850,248 | B1 | 2/2005 | Crosby et al. |
| 7,012,621 | B2 | 3/2006 | Crosby et al. |
| 7,062,107 | B1 | 6/2006 | Crosby et al. |
| 7,073,121 | B2 * | 7/2006 | Brown et al. ............ 715/205 |
| 7,382,380 | B1 | 6/2008 | Crosby et al. |
| 7,487,155 | B2 | 2/2009 | Jebens et al. |
| 7,761,420 | B2 * | 7/2010 | Sharma et al. ............ 707/635 |
| 2002/0135794 | A1 | 9/2002 | Rodriguez et al. |

FOREIGN PATENT DOCUMENTS

WO 2008/006092 1/2008

\* cited by examiner

*Primary Examiner* — Antonio A Caschera
(74) *Attorney, Agent, or Firm* — Eugene I. Shkurko; Amit Singhal (57) ABSTRACT

A method of rendering user-specified image products by executing a plurality of user-interactive tasks relating to an image product. At least some of the user-interactive tasks specify a portion of the image product. A change probability of further changes to the portion of the image product is computed, and if the change probability is below a predetermined threshold, a portion of the image product is rendered.

19 Claims, 11 Drawing Sheets

METHOD FOR IMAGE RENDERING IN A COMPUTER NETWORK

CROSS REFERENCE TO RELATED APPLICATIONS

Reference is made to commonly-assigned copending U.S. patent application Ser. No. 12/827,357 filed of even date herewith entitled, "System For Image Rendering In A Computer Network" by Cok et al. the disclosure of which is incorporated herein by reference in its entirety.

FIELD OF THE INVENTION

The present invention relates to image rendering in a computer network, and particularly to server computers that render images in conjunction with user-interactive client computers.

BACKGROUND OF THE INVENTION

Computer networks typically include multiple computers connected to a common computer communication network, for example the internet. In some computer networks, a server computer provides services to a client computer. The client computer can be a remote computer that accesses services from a server computer over the computer network. The server computer, in turn can access other networked computers providing services useful to the client. Multiple client computers can access a single server computer.

Figure 1:
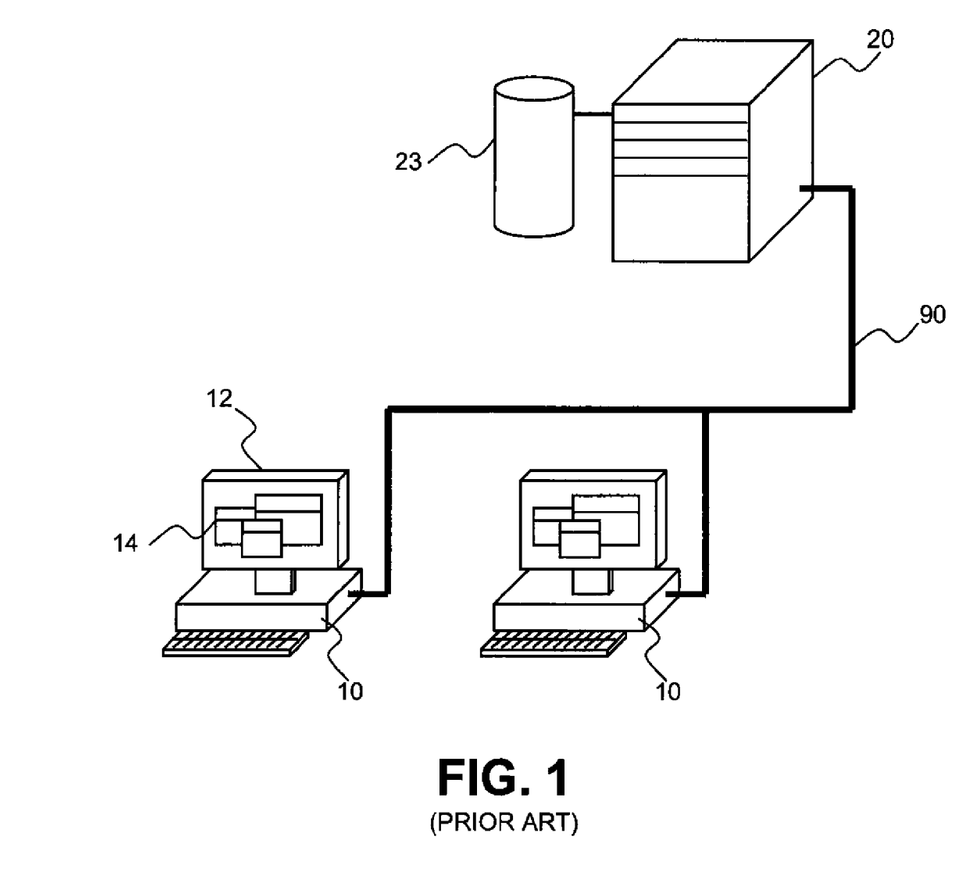
FIG. 1 is a schematic diagram illustrating a computer network with a client computers and a server computer with storage as is known in the prior art.

A typical internet-mediated enterprise conducts business with customers by interacting with users through a web browser on the users' computer. Referring to FIG. 1, client computers 10 having displays 12 execute software applications through graphic user interfaces 14 (e.g. a web browser) connected via a computer network 90 to a server computer 20 having a storage device 23. A user operating the client computer contacts the server computer through the web browser over the computer network to request information. A server provides web pages to the client computer. The client computer displays the pages to the user. The user then interacts with a user interface presented by the web pages. The interaction can take a variety of forms, depending on the nature of the business.

Some internet-mediated businesses use large data sets and data files, for example digital images. Image products purveyed by such businesses are frequently customized by users who desire to process their digital images and use the processed images as part of the image products. The digital images can take perceptible amounts of time to process or transfer over the internet.

Task responsiveness is an important characteristic of any computer application running on a single computer or over a computer network. In particular, users performing work with a computer or over a computer network prefer not to wait for the work to complete. Some computing tasks are performed through a web browser executing on a client computer that interacts with a network-connected server computer. The client computers can execute relatively slowly, particularly for image-processing tasks. Moreover, the time required to transmit digital images from a client to a server over a network can be lengthy.

Responsiveness can be improved by increasing the network bandwidth to improve communication rates. This is particularly useful when large amounts of data, for example images, are communicated between the various network computers, especially between a client and a server, and between a server and a networked storage system. Responsiveness can also be improved by increasing the capacity of the various network elements, for example by using faster computers with more memory.

User-interactive client computer application software downloaded over the internet from a server computer is known in the industry and practiced for a variety of image products, such as photo books, greeting cards, and calendars. The user interaction often includes actions such as selecting images and templates, dragging and dropping images into template image openings, centering, cropping, and zooming selected images in openings, and providing text captions.

Figure 5A:
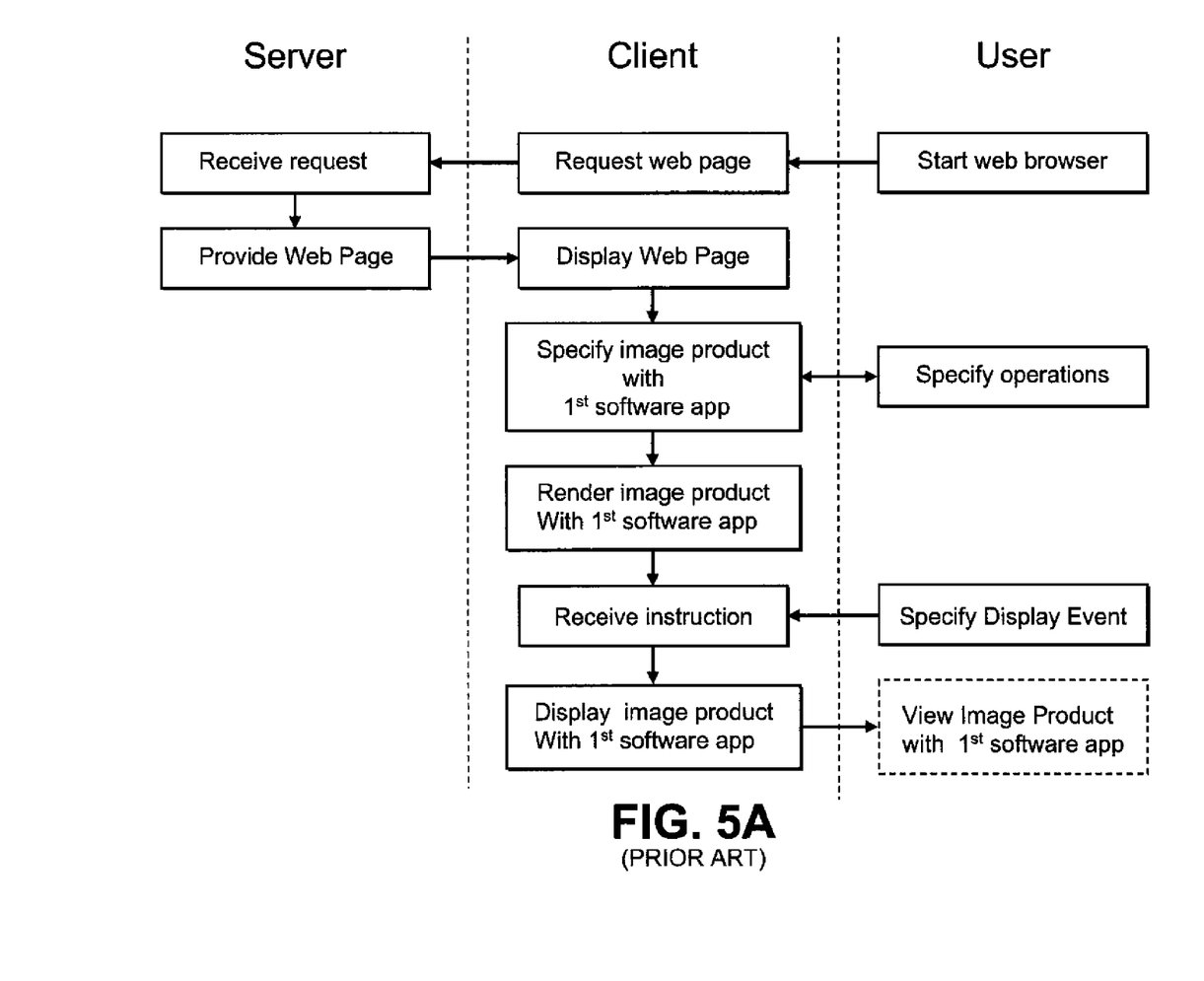
FIGS. 5A and 5B are block diagrams illustrating prior-art processing methods.
Figure 5B:
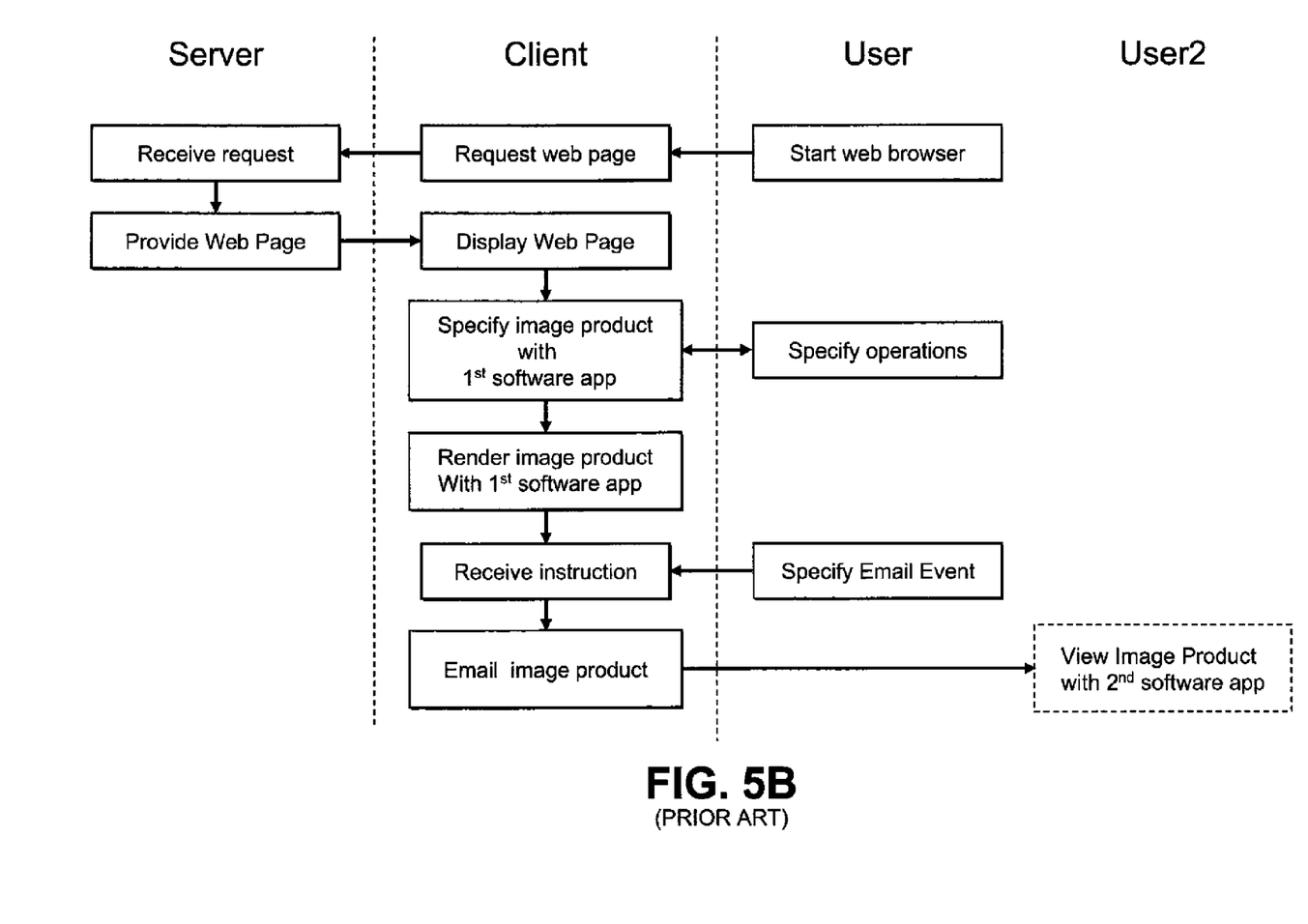

Referring to FIG. 5A, in some prior-art image-processing systems operated through the internet that produce image-based products, a client computer operated by a user requests web pages from a server through a web browser. The server responds to the request with the requested information, often including a user-interactive interface and first processing software. This interface can be displayed to the user by the client, at which point the user can interact with the software on a client to specify an image product. Once the specification is complete, the image product is rendered on the client computer and, in response to a user event such as a request to preview the image product, the image product is displayed by the first software application to the user. Alternatively, referring to FIG. 5B, a user might request that the rendered image product be emailed to a second user, who can then display the rendered image product using the same, or different, software on a different client computer.

Figure 6A:
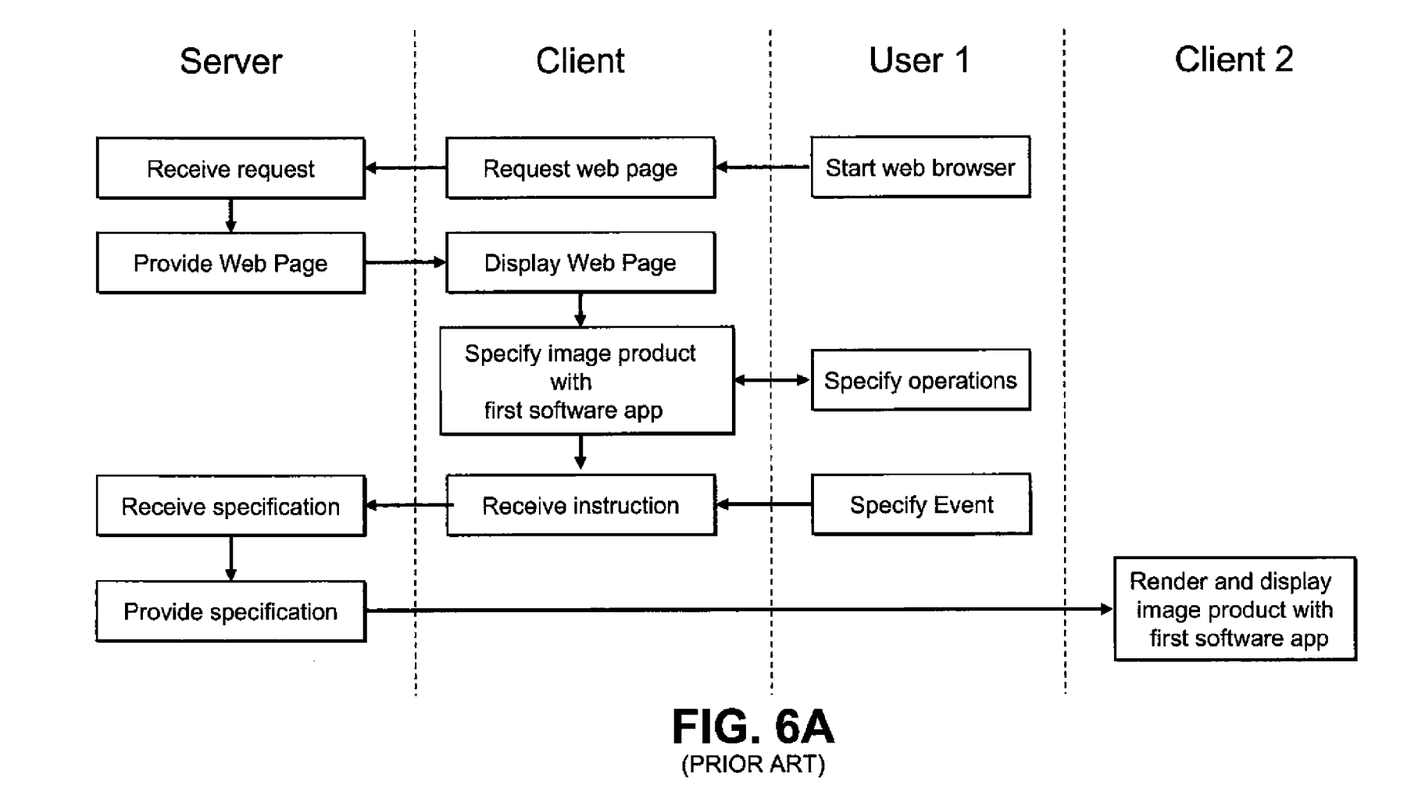
FIGS. 6A and 6B are block diagrams illustrating prior-art processing methods.
Figure 6B:
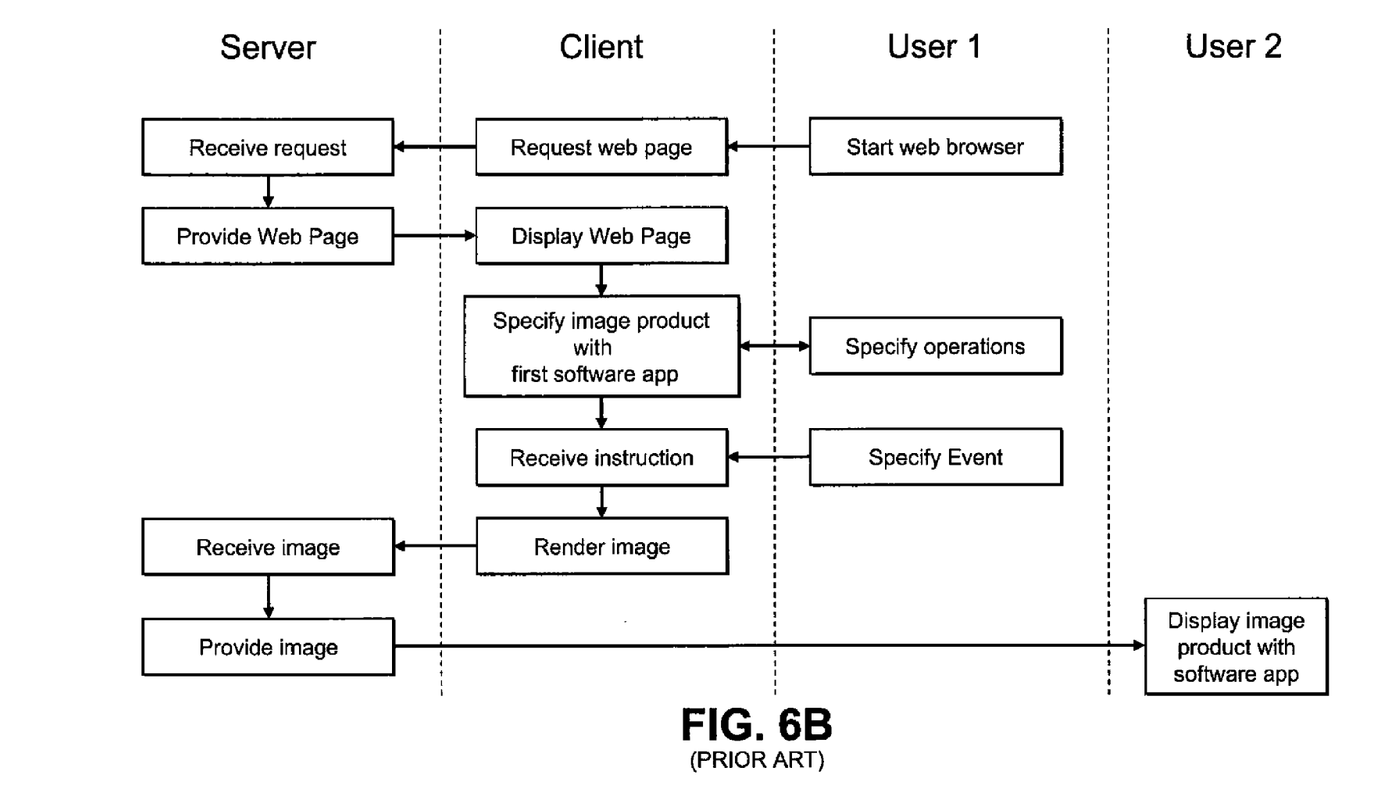

In an alternative prior-art workflow model illustrated in FIG. 6A, a client computer operated by a user requests web pages from a server through a web browser. The server responds to the request with the requested information, often including a user-interactive interface and first processing software. This interface can be displayed to the user by the client, at which point the user can interact with the software on a client to specify an image product. The image product can be interactively viewed, for example with low-resolution images. Once the specification is complete, the specification can be stored and, in response to a user event, such as a request to preview the final image product, the specification can be sent to a server and then to a second client where it is rendered, for example using the same type of software tool as was used to specify the image product. Alternatively, as shown in FIG. 6B, the image product can be rendered on the client using the same software application, the rendered image transferred to a server where it can be stored and then provided to other users upon request from the other users. The other users can view the rendered image product with any suitable image viewing software.

In all of these prior-art cases, the time between specification of an image product and the availability of a rendered image product can be perceptible. While increasing the performance of network devices such as client computers, server computers, and computer networks is useful, there remains a need for improving networked computer services to provide responsive and efficient performance for given network and computing resources.

SUMMARY OF THE INVENTION

In accordance with the present invention, there is provided a method of rendering user-specified image products comprising the steps of editing the image product during which a change probability of further changes to a portion of the image product is computed. If the change probability is below a predetermined threshold, then a portion of the image product is rendered. A server computer communicates with one or more user-interactive client computers through a computer communication network. The client computers render portions of the image product corresponding to user-interactive tasks specifying edits for a portion of the image product. One or more user-interactive software applications are provided from the server to the client computer through the computer communication network, the user-interactive software applications including software to execute the plurality of user-interactive tasks. The image product can be rendered on the server computer and display the rendered image product on a client computer, the client computer having fewer computing resources than the server computer.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Referring to FIG. 1 and as noted above, computer systems can include a plurality of client computers 10 connected by a computer network 90 to a server computer 20 that can include a storage facility 23, such as a hard disk drive. The client computers 10 can execute software programs that can include user-interactive programs interacting with a user through a graphic user interface 14 on a display 12. In one computer system, the server computer 20 provides user interface and processing software over the internet to a client computer 10 at the request of a user operating the client computer 10. The software provided to the client computer 10 from the server can then interact with the user through a graphic user interface program such as a web browser. Appropriate computers, networks, and storage devices are all known in the art.

Figure 2:
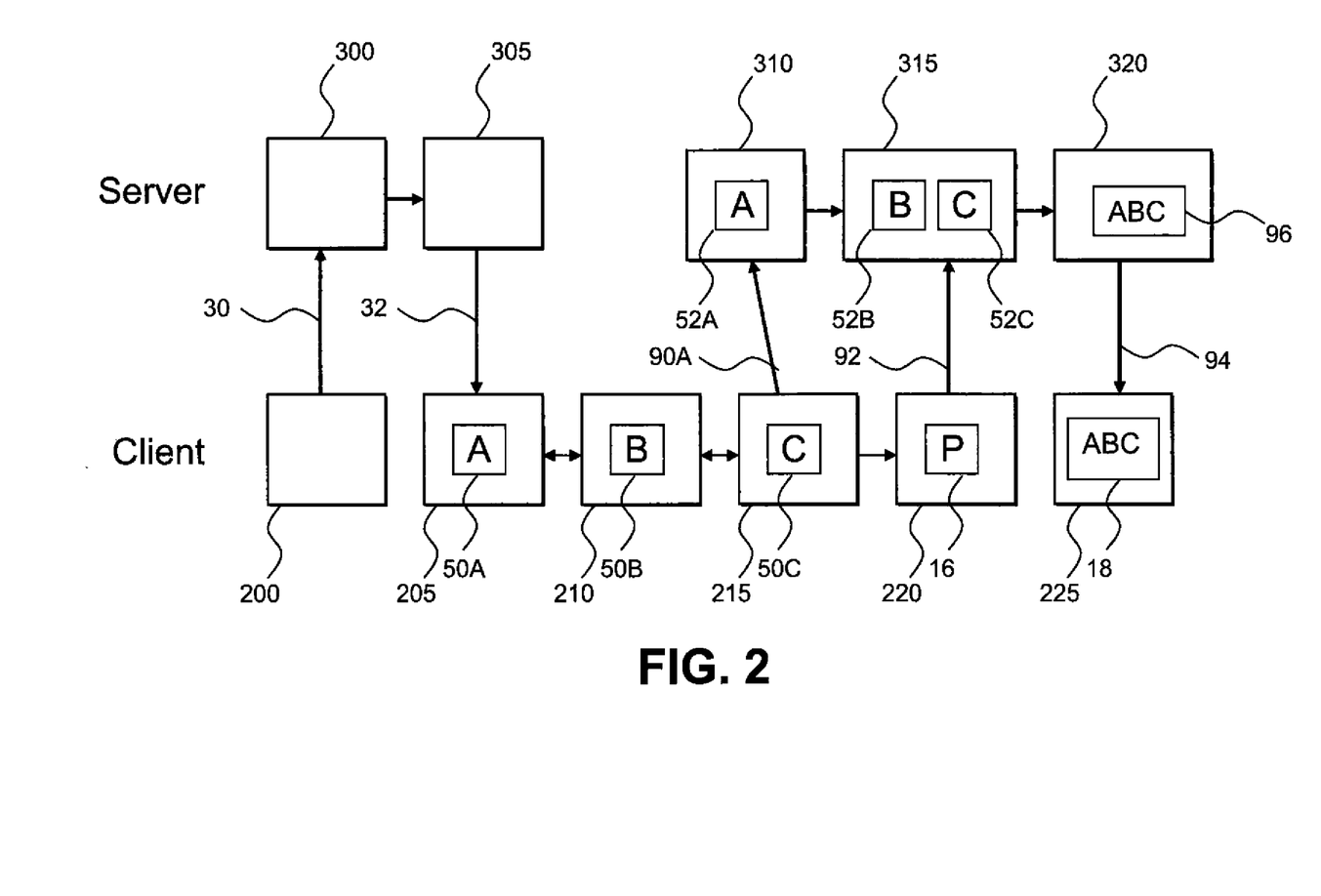
FIG. 2 is a block diagram illustrating a method according to an embodiment of the present invention.

Referring to FIG. 2, in one embodiment of the present invention intended for image manipulation, specification, and creation of an image-based product, a client computer requests web pages from a server computer in step 200 over a computer network, e.g. the internet. The server computer receives the request 30 in step 300, retrieves the necessary information from storage and sends the requested information 32, e.g. web pages and image application software, in step 305. The client computer receives the web pages and image application software and executes the software to user-interactively specify an image product page A 50A having one or more images in step 205.

The user can then interactively specify a second page B 50B in step 210. A user can return to step 205 to further refine or modify choices made in step 205 to page 50A or can begin working on page C 50C in step 215. Again, a user can return to further refine or modify the specification of page 50B in step 210 or to step 205 to further refine or modify the specification of page 50A. Although only three pages, 50A, 50B, and 50C, are illustrated in FIG. 2, a knowledgeable practitioner will understand that the number of pages, images, and user interactive tasks is not limited. For example, multiple pages can be specified, each page having one or more images that may or may not be processed further and may or may not include captions or other explanatory or decorative text or other elements. Hence, a method according to an embodiment of the present invention includes executing a plurality of user-interactive tasks that relate to an image product, at least some of the user-interactive tasks specifying a portion of the image product.

Other user-interactive tasks relating to an image product can include steps such as requesting a preview of the entire product, storing the product, emailing the product, requesting to purchase a print of the product, or requesting purchase-related information. Many of these tasks are more efficiently done with a completely rendered version of the image product, rather than from a specification of the image product that describes how to make the product. Computing time can be reduced and user responsiveness improved for many image-centric tasks when a rendered image of the desired image-based products is needed. However, rendering the image product can be slow on relatively lower-performance client computers and can even take a noticeable amount of time for a more-powerful server computer.

To improve system efficiency and user responsiveness, a change probability of further changes to a portion of the image product specified by at least one of the plurality of user-interactive tasks can be computed. Portions can be, for example, pages. In one embodiment of the present invention, a change probability is assigned to every page or separately rendered image within an image product, for example pages in a photobook, a calendar, or sides of a greeting card. As each page is specified, the change probability can be modified for any or all of the pages depending on the history of the user interaction with the software application.

A photo-book can include multiple pages, for example 20 pages. When the user interacts with the application software, the first page is typically specified first and the following pages are specified in order. As the user progresses through the pages, the probability of changes to the earlier pages decreases so the change probability of the first page can be decreased as the user moves closer to a complete design and specification of page 20. Other user-interactive tasks, such as those listed above, can also suggest a modification in the change probabilities of one or more pages.

As long as the change probability for a user-interactive task remains above a pre-determined threshold, the portions of the image product corresponding to the user-interactive task are not rendered. If the change probability is below the predetermined threshold, the portion of the image product corresponding to the user-interactive task is rendered and stored, to be available for faster access and display in case of a future request to review the design. The rendering can be on the client computer itself, for example running in the background, or on a remote server. Referring to FIG. 2, performing steps 205, 210, 215, or 220 can each modify the change probabilities for corresponding portions, e.g. the pages, of the image product as will be explained in more detail below.

At step 215, for example, the change probability for page A 50A might be computed to be below the pre-determined threshold which then triggers a message 90A to be sent to the server along with the specification of page A. The server then begins to render page A to form a rendered page A 52A in step 310. It is possible that the user could return to step 205 and make further modifications to page A, so that the task of rendering page A in step 310 must be repeated. Therefore, the pre-determined probability threshold should be chosen to ensure that the risk of repeating the rendering step is tolerable and that the expected value of the rendered page A, in terms of time saving efficiency, exceeds the costs of repeating the task in the overall user work flow.

The user then moves to step 220 and initiates an event 16, for example, a decision to display, purchase, or email the specified image product containing pages A, B, C (50A, 50B, 50C respectively). This decision decreases the change probabilities for all three pages to below the pre-determined threshold which then triggers a second message 92 to be sent to the server to begin the rendering process for all three pages. Following the completion of rendered page A 52A in step 310, the server renders pages B 52B and C 52C in step 315. Because the rendering of page A was completed earlier, the delay in completely rendering all of the pages on the server is reduced, demonstrating the utility of the present invention. Once all of the pages are completely rendered, the rendered image product 96 is completed in step 320 and is, in this example, sent to the client computer with a rendered image product message 94 so that the client computer can display the image product 18 in step 225. Because the rendering of page A commenced when the change probability for page A decreased below the pre-determined threshold, rather than waiting until all pages A, B, and C, were completed, the rendering of the entire image product was completed quicker and the image product displayed sooner than it would otherwise have been displayed, improving the responsiveness of the system and process.

Figure 3:
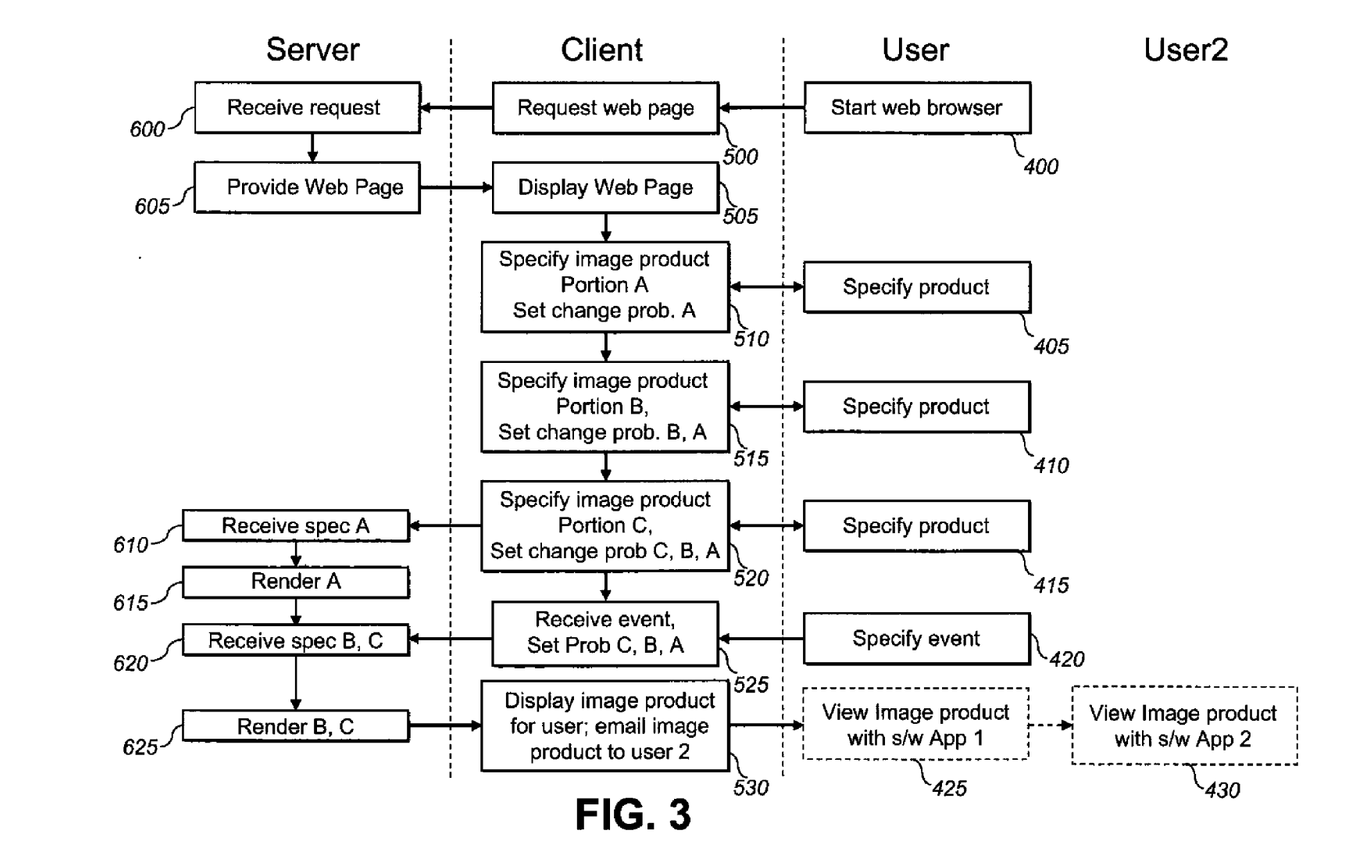
FIG. 3 is a block diagram illustrating an embodiment of a method according to the present invention.

Referring to FIG. 3, the interaction of the user and the computation of the change probabilities associated with the user-interactive tasks are shown explicitly. As shown in FIG. 3, a user starts a web browser on a client computer in step 400 and initiates an interaction with a web site to select an image product. The client computer then requests the corresponding web pages from the server computer in step 500. The server computer receives the web-page request in step 600 and responds with the corresponding web pages, including user-interactive graphic interfaces and image processing software, in step 605. The web pages are displayed and the user-interactive image processing software executed on the client in step 505. The user then begins to perform user-interactive tasks to specify portion A (e.g. a page) of an image product in step 405. When that interaction is complete (step 510) a change probability value is set by the client computer. The client computer also stores a pre-determined threshold probability, therefore, at this step a threshold comparison can be performed at the client computer. Alternatively, the server computer could be programmed to set and manage the change probability values and compare the change probability values to pre-determined thresholds. The image product specification for each portion is stored on the client computer and can also be transmitted to the server.

The user then begins to perform user-interactive tasks to specify portion B (e.g. a second page) of an image product in step 410. When that interaction is complete (step 515) a change probability value is computed by the client or server computer for portion B and the change probability is modified for portion A. Typically, as more portions are completed the change probabilities for the portions completed earlier are reduced. In this example, the change probability for portion A is not yet below the pre-determined threshold, so no additional action, such as rendering portion A, is taken.

The user then begins to perform user-interactive tasks to specify portion C (e.g. a third page) of an image product in step 415. When that interaction is complete (step 520) a change probability value is set by the client or server computer for portion C and the change probability is reduced for portions B and A. In this example, the change probability for portion A is now below the pre-determined threshold, so a rendering instruction is sent to the server as part of step 520 and received by the server in step 610. The server then renders portion A in step 615 while the user continues to interact with the client.

The user then takes an action to specify an event, for example a request to view the image product and to send the rendered view of the image product to a second user in step 420. The event is received by the client in step 525 and the probabilities for all three image product portions A, B, and C are modified. The event is such that the change probabilities for all three portions are reduced below the pre-determined threshold, so that a message and the page specifications are communicated to the server computer in step 525. The server computer receives the message in step 620 and renders the remaining pages B and C in step 625 (page A was completed earlier). Once rendered, the rendered pages can be communicated to the client and received and displayed by the client in step 530 to the user, who views the rendered image product in step 425. The rendered image product is also or alternatively emailed to a second user and viewed in step 430.

According to an embodiment of the present invention, the portions of the image product do not necessarily have to be interactively specified by a user in a particular order. If the portions are pages, they can be specified sequentially or they can be specified in other orders, depending on the interaction of the users and the software application. The change probabilities associated with the portions can be set by analyzing user behavior on the web site server or by the client computer. For example, if out of a sample set of purchasers of a particular image product, 50% modify a first portion after a first design and specification interaction, the change probability for the first portion can be set at, for example, 50% after the first design specification is completed (e.g. step 510 of FIG.

3), which can also be used as an initial default value. These percentages are tracked and stored over time as users access the web servers and utilize the services provided. If only 25% change the first portion after a design and specification session is completed for the first and a second portions, the change probability of the first portion can be set at 25% after the first two portions are specified (e.g. step 515 of FIG. 3). If only 10% change the first portion after completing the specifications for the first, second, and third portions e.g. step 520 of FIG. 3), the change probability of the first portion can be set at 10%, and so forth. Thus, the change thresholds are selected based on actual user activity and can be initially set at the default values just described above or just below these values. For example, the threshold for portion A can be set at 49% so that it is rendered only after portion B is specified. These values can be updated as user activity statistics are accumulated. Thus, an algorithm can be programmed at the client or server computer that specifies and stores the probability threshold for portion A to be, for example: (percentage of users modifying portion A after first specification of portion A)−1%. Other algorithms can easily be programmed and utilized herein.

A rendered image can be displayed on a client computer using the same software application used to specify the image product. However, such software can be large and relatively slow. In another preferred embodiment of the present invention, a different software application can be employed to display a rendered image product, for example a simple image viewer or slide show application. Since the viewing software can be downloaded from a server computer as part of the viewing process, it can be faster to use a simple program that has a smaller executable code and that executes faster than a more complex user-interactive software application that supports image product specification. Furthermore, since client computers often have fewer computing resources than server computers, it is useful to have simple software display applications that load and display images quickly. This difference is illustrated in FIG. 3 in which user 2 uses a software application 2 at step 430 different from the software application 1 for user 1 to view the rendered image at step 425.

Figure 4:
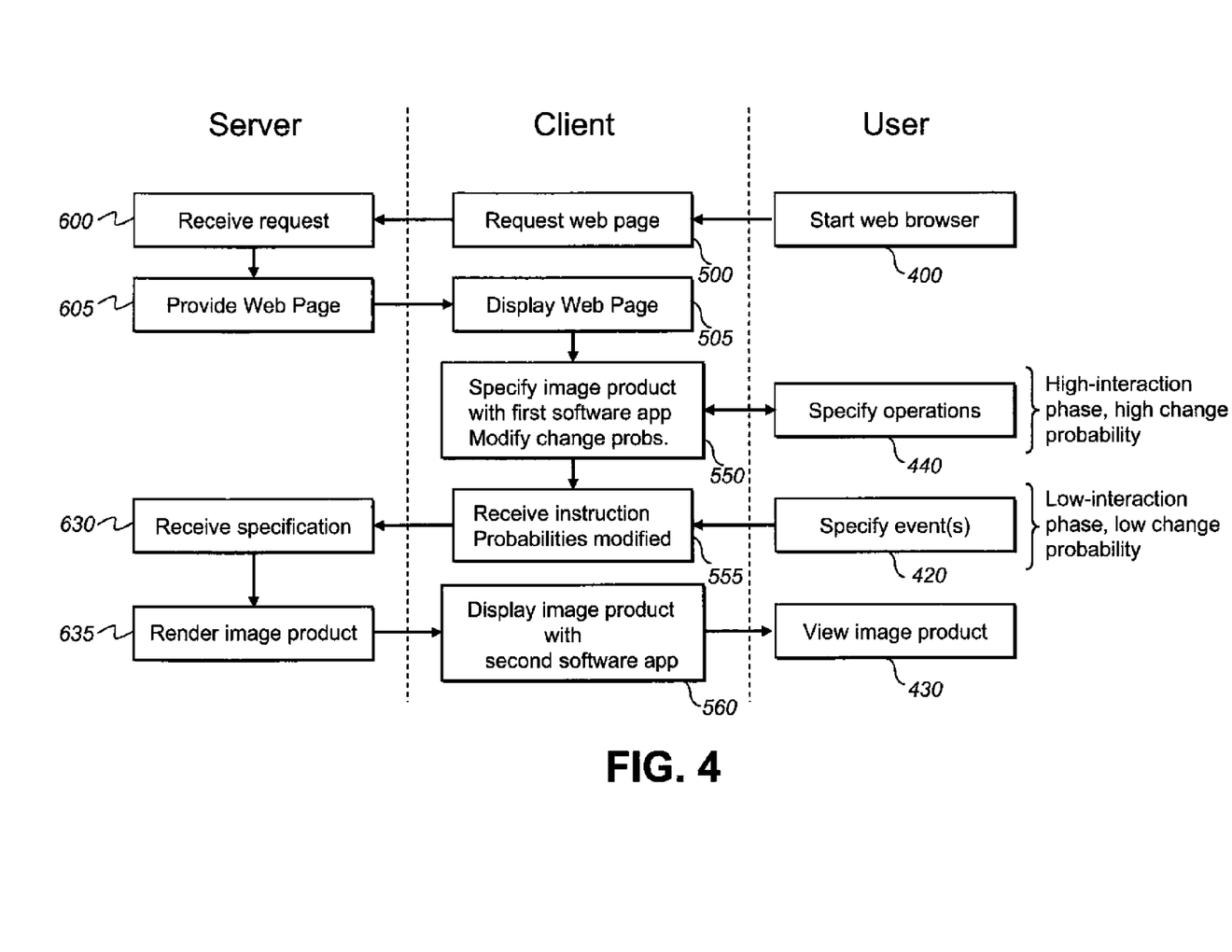
FIG. 4 is a block diagram illustrating an alternative embodiment of a method according to the present invention.

Referring to FIG. 4 in another preferred embodiment of the present invention, all of the image product specification user interactions (step 440) are completed with the client computer before any of the portions of the image product are rendered. The change probabilities are modified (step 550), but for the image product of this example the change probabilities remain too high and are not less than the pre-determined threshold value for any of the portions until an event is specified by a user (step 420) that has the effect of decreasing the probabilities for the image product portions below the predetermined threshold level. A completed specification is therefore sent to the server and received by the server in step 630. The image product is rendered on the server computer in step 635, returned to the client computer and displayed in step 560 so that the user can view the image product in step 430.

The method illustrated in FIG. 4 has two distinct phases, a high-interaction phase (steps 440 and 550) and a low-interaction phase (steps 420 and 555) resulting in rendering the image product. As long as the user interactively operates in the high-interaction phase, the change probabilities of the image product portions remain high. Once the user specifies an event (step 420), the process enters the low-interactivity phase that results in low change probabilities and rendering the image product.

Figure 7:
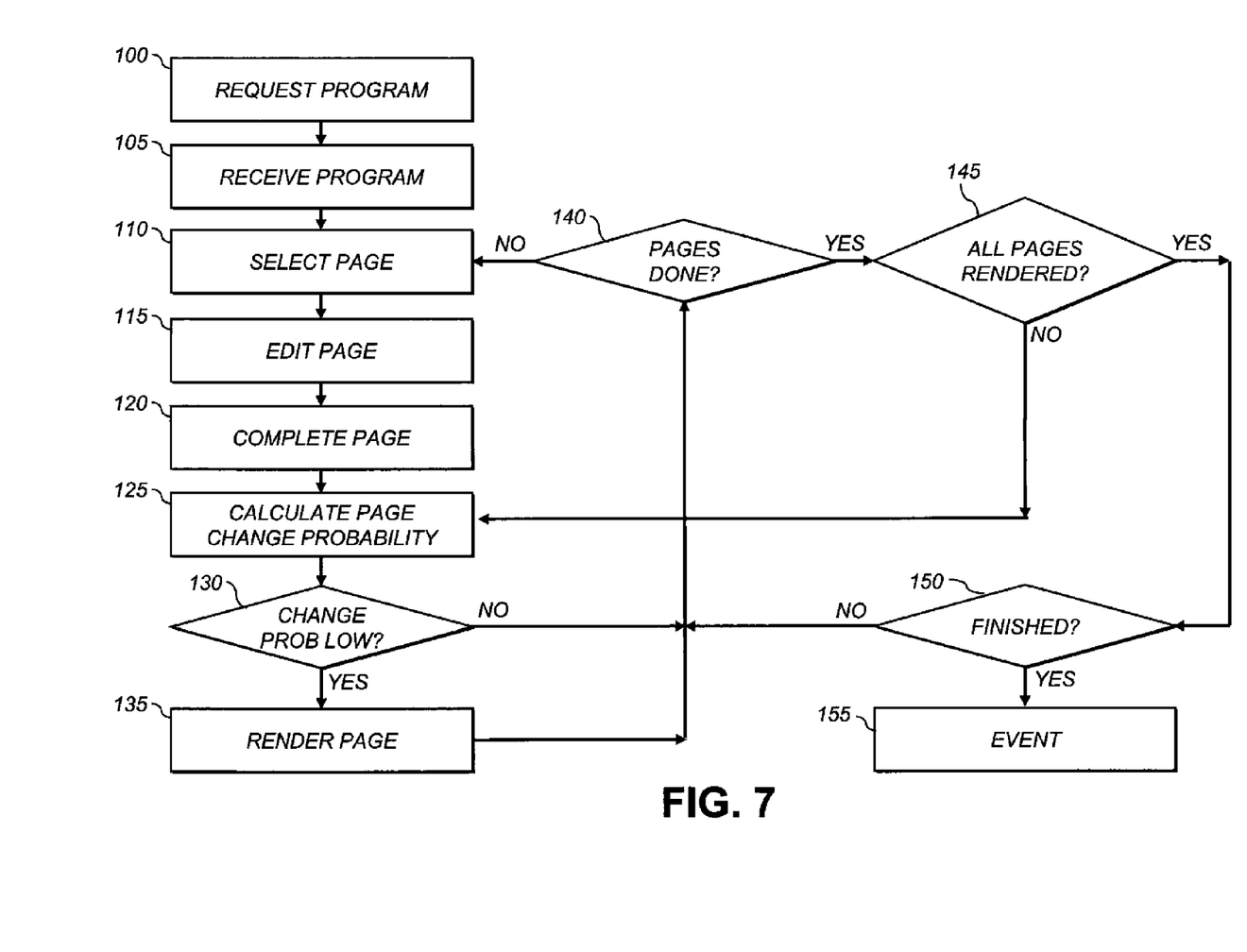
FIG. 7 is a flow diagram illustrating a more detailed embodiment of a method according to the present invention.

Referring to FIG. 7, a preferred embodiment of the current invention applied to a multi-page image product, such as a photobook, is illustrated in a flow diagram. In step 100, a client computer can request a program from a server computer, for example at the instruction of a user. The program is received from the server computer and executed by the client computer in step 105. The user interactively selects a page to specify in step 110 and edits the page in step 115, for example by selecting images matched to openings in selected page templates, cropping images, removing red-eye from the image, centering the image, and enlarging the image as desired. Once the user completes the page specification in step 120, a change probability for the page is determined, for example by assignment from a known history of usage patterns or by calculation using an algorithm that includes relevant parameters such as the number of pages completed. The change probability for any other specified pages is also modified as appropriate, if the change probabilities for any of the pages is different given the just-specified page completion.

The change probability for each of the pages is then tested to discover whether it is below a pre-determined threshold in step 130. If it is, then the page can be rendered in step 135, for example on a server computer. If not, the user continues to step 140. If not all of the pages are specified (step 140), the user can select another page (either a new one or one that the user desired to modify) in step 110. If the page specifications are complete, and all of the pages are rendered (step 145), the user then decides whether to continue working (step 150) for example by specifying an event 155, such as a desire to purchase, display, print, or communicate the specified and rendered image product. A user might also decide to change a page, even though it has been rendered, and return to step 140, in which case a page can be selected (step 110) and the process proceed as before, except that the page is no longer considered to be rendered and the change probability for that page might increase. This simple process does not illustrate other actions that might be taken by a user, for example to abandon the work or store the work until a future time. A user might also choose to continue work with an event (such as emailing a draft version of the image product) even when the pages for the image product are not all complete. In the context of the flow diagram of FIG. 7, this process can be considered to have the pages of the specified image product done and rendered, at least temporarily.

The method of the present invention can include the steps of providing a server computer that communicates to one or more user-interactive client computers through a computer communication network, executes a plurality of user-interactive tasks on a client computer, and renders a portion of the image product corresponding to a portion of the image product specified by at least one of the plurality of user-interactive tasks on a server computer. The method can further include the steps of providing one or more user-interactive software applications to a client computer from the server computer through the computer communication network, the user-interactive software applications including software to execute the plurality of user-interactive tasks or to display rendered images. The user-interactive processes can be supported by both a client and a server computer working in conjunction over the computer network. Image products can be rendered on the server computer and displayed on a client computer, the client computer having fewer computing resources than the server computer. Since the step of rendering complete image products at the resolution of the images can take perceptible amounts of time, low-resolution or thumbnail images can be rendered and displayed on a client computer to enhance the interactivity of the computer system. When the full-resolution rendered images are available (e.g. from the server), the full-resolution rendered images can replace the low-resolution images.

As noted above, the change probabilities can be measured from actual usage statistics. The probabilities can be stored in a table, for example a multi-dimensional table, and assigned default threshold values, as explained above, and, as users progress through the specification of an image product, they are updated. Alternatively, an algorithm for calculating the threshold change probabilities can be used, as explained above, or a combination of assigned and calculated values can be used. Change probabilities can be increased, as well as decreased, depending on the user interactions and image product portion specifications. For example, a first portion could be interactively specified by a user and the change probability for the first portion set to a first value. A second portion could then be interactively specified by the user and the change probability for the first portion reduced to a second value, indicating that the first portion is then less likely to be modified. However, if the user then interactively modifies the specification for the first portion, then the change probability for the first portion could be increased, for example to the first value, or even to a value greater than the first value.

Image products can include image product portions that have more than one image in a multi-page product. A user-interactive task that has an associated change probability can include the specification of a page in a multi-page image product. Alternatively, a user-interactive task that has an associated change probability can include the specification of multiple pages in a multi-page image product. Hence, each task portion corresponding to a user-interactive task in an image product can include one or more images or one or more pages. Not all image-based products have separate pages, for example some greeting cards can have only one page or image products such as mugs can have no pages at all.

In a client server arrangement mediated over the internet through a web browsing interface, user interaction (e.g. a graphic user interface) and image-file processing operation programs can be stored on the server computer and supplied to the client computer on request. The user interaction program can incorporate the image processing operation program, or they can be separate. The user interaction program can be provided as part of a web page served from the second computer. Hence, image processing, specification, or display programs can be stored on a server computer, and supplied to the client computer by transferring the first program over the computer network from the server computer to the client computer. Images can be provided by users through a client computer or stored on a server computer and transferred to the client computer. Low-resolution versions of the images suitable for image product specifications can be transferred from a server computer to a client computer and the high-resolution images kept on the server computer and used to render the specified image products.

The present invention provides advantages over methods known in the prior art. By rendering portions of an image product when the probability of further changes to the portions is low, the time required to complete the rendering of the entire image product is reduced. If the rendering is done on a server computer separate from a user-interactive client computer, the rendering can be done without affecting the user interaction. Hence, in response to an action by the user, the entire image product can be rendered in less time and a more responsive user experience provided. Furthermore, by rendering a portion of the image product on a server computer while the user interacts with a client computer, the server computer can be used more efficiently, reducing computing costs.

Figure 8:
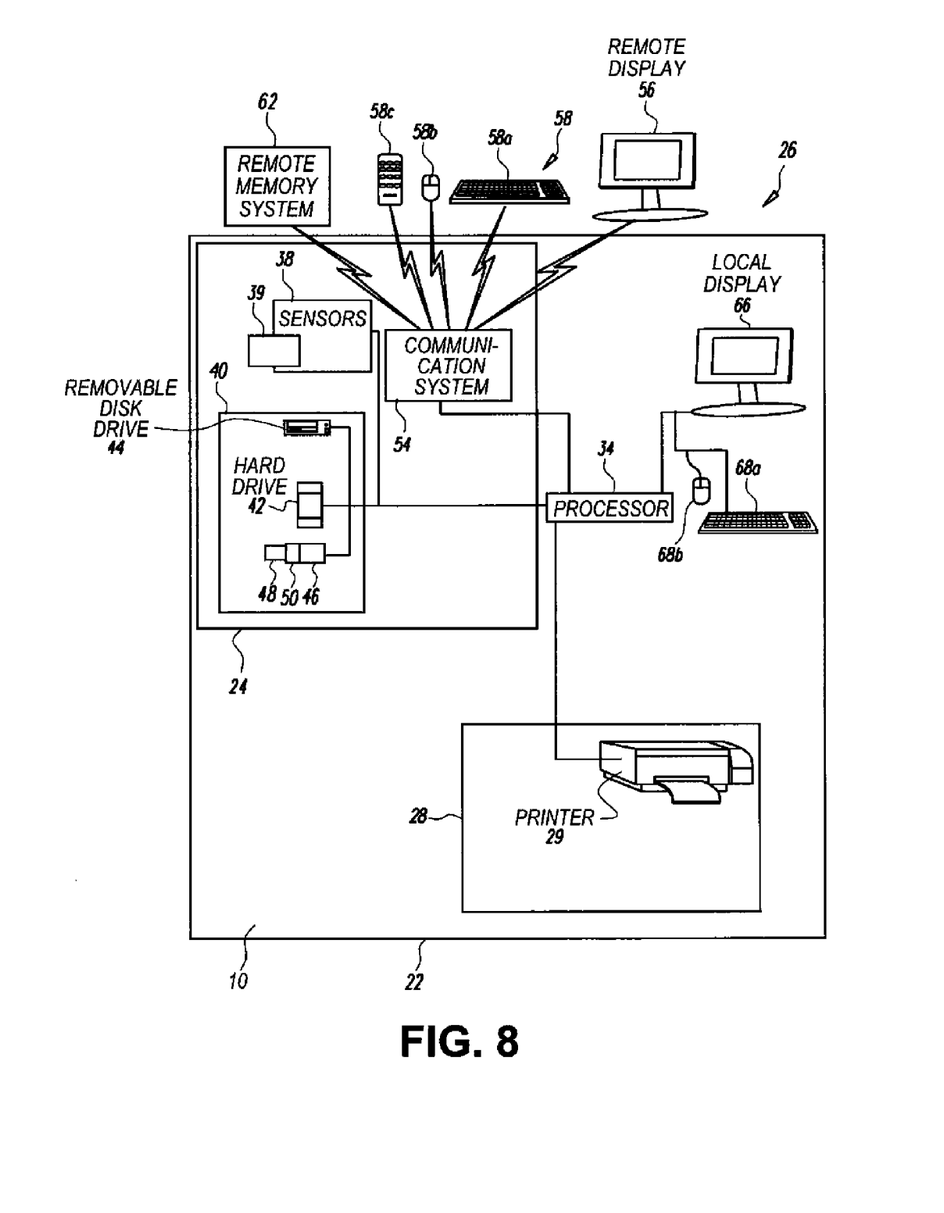
FIG. 8 is a processing system.

FIG. 8 illustrates a first embodiment of an electronic system 10 that can be used as a client computer in generating an image product as described herein. In the embodiment of FIG. 8, the computer system 10 comprises a housing 22 and a source of content data files such as digital images that have been prepared by or using other devices. In the embodiment of FIG. 8, source of content data files 24 includes sensors 38, a memory 40 and a communication system 54.

Sensors 38 are optional and can include light sensors, a camera and other sensors known in the art that can be used to obtain digital images in the environment of the system 10 and to convert this information into a form that can be used by processor 34 of the system. Sensors 38 can also include one or more video sensors 39 that are adapted to capture images.

Memory 40 can include conventional memory devices including solid state, magnetic, optical or other data storage devices for storing images, image products, and tables of probability thresholds which can be the same as, or separate from, tables storing change probabilities. Memory 40 can be fixed within the system or it can be removable. In the embodiment of FIG. 8, the system 10 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, software, control programs, digital images and metadata can also be stored in a remote memory system 52, corresponding to server memory 23 as described above (the server itself is not shown).

In the embodiment shown in FIG. 8, communication system 54 that in this embodiment can be used to communicate with an optional remote memory system 52, an optional a remote display 56, and/or optional remote input 58. A remote input station including a remote display 56 and/or remote input controls 58 (also referred to herein as "remote input 58") can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input system 26 provides a way for a user of the system to provide instructions to processor 34. This allows such a user to make a designation of content data files to be used in generating image product specification and to select an output form for the output product. User input system 26 can also be used for a variety of other purposes including, but not limited to, allowing a user to arrange, organize and edit image products to be incorporated into the image product, to provide information about the user or audience, to provide annotation data such as voice and text data, to identify characters in the content data files, and to perform such other interactions with the system.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 8, user input system 26 includes an optional remote input 58 including a remote keyboard 58a, a remote mouse 58b, and a remote control 58c and a local input 68 including a local keyboard 68a and a local mouse 68b.

Figure 9:
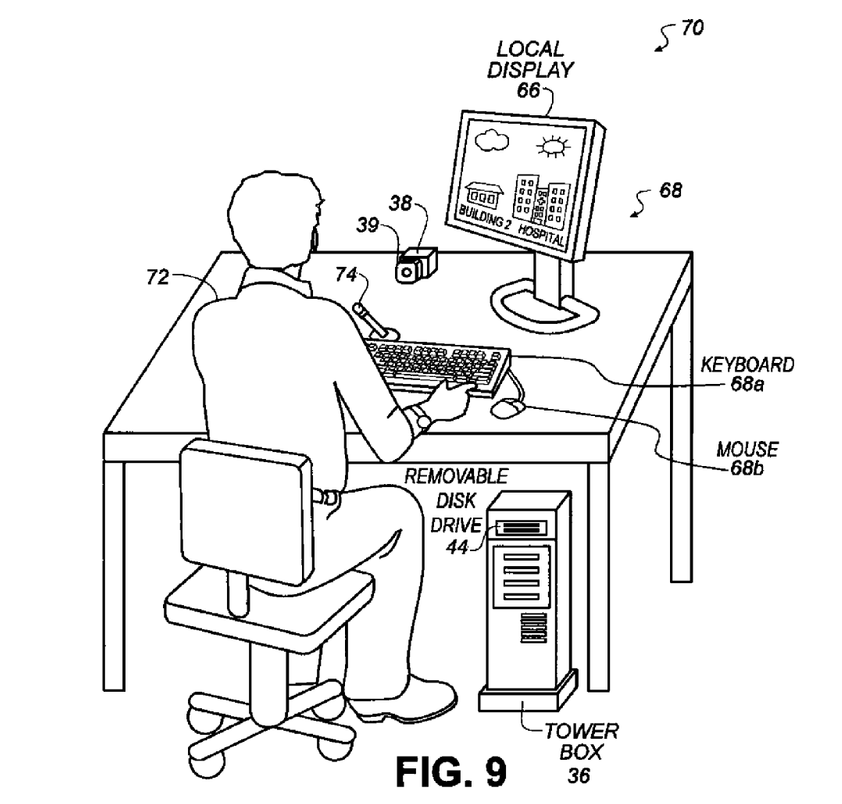
FIG. 9 is a typical processing system setup for user interaction.

As is illustrated in FIG. 9, client input 68 can take the form of an editing studio or kiosk 70 (hereafter also referred to as an "editing area 70"). In this illustration, a user 72 is seated before a computer 36, a console comprising local keyboard 68a and mouse 68b, and a local display 66 which is capable, for example, of displaying multimedia content. As is also illustrated in FIG. 9, editing area 70 can also have sensors 38 including, but not limited to, video sensors 39, audio sensors 74 and other sensors.

Output system 28 is used for rendering images, text or other graphical representations in a manner that allows image product specifications to be designed and recorded. In this regard, output system 28 can comprise any conventional structure or system that is known for printing rendered image products such as on printer 29. Printer 29 can record images on a tangible surface using a variety of known technologies. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale or sepia toned images.

In certain embodiments, the source of content data files 24, user input system 26 and output system 28 can share components. Processor 34 operates system based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

The present invention can be employed to support businesses conducted over the internet, in particular businesses that employ large amounts of digital storage, such as image printing with a client that interacts with a server and image storage system. It has been shown that improved responsiveness and efficiency are provided by using the various methods of the present invention.

The invention has been described in detail with particular reference to certain preferred embodiments thereof, but it will be understood that variations and modifications can be effected within the spirit and scope of the invention.

PARTS LIST 10 client computer
12 display
14 graphic user interface
16 event
18 displayed image product
20 server computer
22 housing
23 server memory / storage device
24 source of content data files
26 user input
28 output system
29 printer
30 request image software application message
32 image software application message
34 processor
36 computer
38 sensors
39 video sensors
40 memory
42 hard drive
44 disk drive
46 memory card slot
48 removable memory
50 removable memory interface
52 remote memory system
54 communication system
56 remote display
58 remote input
58a remote keyboard
58b remote mouse
58c remote control
local display
local input
68a local keyboard
68b local mouse
70 editing studio or kiosk
72 user
74 audio sensors
90 computer network
90A page A low change probability message
92 all pages low change probability message
94 rendered image product message
50A page A
50B page B
50C page C
52A rendered page A
52B rendered page B
52C rendered page C
96 rendered image product
90 computer network
100 request program step
105 receive program step
110 select page step
115 edit page step
120 complete page step
125 calculate page change probability step
130 change probability low decision step
135 render page step
140 pages done step
145 all pages rendered decision step
150 continue step
155 event
200 request web pages step
205 receive web pages and specify page A step
210 specify page B step
215 specify page C step
220 event step
225 display image product step
300 receive web page request step
305 send web pages and image application step 310 render page A step
315 render pages B and C step
320 complete image product step
400 start web browser step
405 specify product step
410 specify product step
415 specify product step
420 specify event step
425 view image product step
430 view image product step
440 specify operations step
500 request web page step
505 display web page step
510 specify image product step
515 specify image product step
520 specify image product step
525 receive event step
530 display and email image product step
550 specify image product step
555 receive instruction step
560 display image product step
600 receive request step
605 provide web page step
610 receive specification step
615 render step
620 receive specification step
625 render step
630 receive specification step
635 render image product step

The invention claimed is:

1. A method of rendering user-specified image products, comprising the steps of:
executing a plurality of user-interactive tasks relating to an image product, at least some of the user-interactive tasks specifying a portion of an image product;
computing a change probability of further changes to a portion of the image product specified by at least one of the plurality of user-interactive tasks;
if the change probability is below a predetermined threshold, rendering the portion of the image product corresponding to the at least one of the plurality of user-interactive tasks specifying a portion of the image product; and
modifying the change probability of the user-interactive task depending on the execution status of other user-interactive tasks.

2. The method of claim 1, further comprising the steps of providing a server computer that communicates with one or more user-interactive client computers through a computer communication network, executing the plurality of user-interactive tasks on a client computer, and rendering the portion of the image product corresponding to the at least one of the plurality of user-interactive tasks specifying a portion of the image product on a server computer.

3. The method of claim 2, further comprising the steps of providing one or more user-interactive software applications to a client computer from the server computer through the computer communication network, the user-interactive software applications including software to execute the plurality of user-interactive tasks.

4. The method of claim 2, further comprising the steps of rendering the image product on the server computer and displaying the rendered image product on a client computer, the client computer having fewer computing resources than the server computer.

5. The method of claim 2, further comprising the step of rendering a thumbnail image of at least a part of the image product using low-resolution images of the image product and user images and displaying the rendered thumbnail image on the client.

6. The method of claim 1, further comprising the step of calculating a change probability for one or more user-interactive tasks depending on the execution status of other user-interactive tasks.

7. The method of claim 1, further comprising the step of providing a pre-determined change probability for one or more user-interactive tasks.

8. The method of claim 1, further comprising the steps of sequentially executing a first user-interactive task, executing a second user-interactive task, and then executing at least a portion of the first user-interactive task again.

9. The method of claim 1, further comprising the steps of executing one or more user-interactive tasks that define pages having one or more images in a multi-page image product.

10. The method of claim 1, further comprising the steps of executing one or more user-interactive tasks that communicate the image product or that provide purchasing information for the image product.

11. The method of claim 1, further comprising the steps of providing a change probability for more than one of the plurality of tasks.

12. The method of claim 1, further comprising the steps of executing all of the user-interactive tasks that define pages in a multi-page image product before rendering one of the pages in the multi-page image product.

13. The method of claim 1, further comprising the step of displaying the rendered image product.

14. The method of claim 13, further comprising the step of displaying the rendered image product with a different software application than a software application used to execute the user-interactive tasks, the user-interactive tasks including rendering and display software.

15. The method of claim 14, further comprising the step of displaying the rendered image product with the different software application faster than the rendering and display software application used to execute the user-interactive tasks.

16. The method of claim 13, further comprising the step of displaying the rendered image product on a different client computer than the client computer on which the user-interactive tasks are executed.

17. The method of claim 1, wherein the user-interactive tasks specify the image product without completely rendering an image of the image product at the resolution of the images in the image product.

18. A method of rendering user-specified image products, comprising the steps of:
executing a plurality of user-interactive tasks relating to an image product, at least some of the user-interactive tasks specifying a portion of an image product;
computing a change probability of further changes to a portion of the image product specified by at least one of the plurality of user-interactive tasks;
if the change probability is below a predetermined threshold, rendering the portion of the image product corresponding to the at least one of the plurality of user-interactive tasks specifying a portion of the image product; and
executing fewer than all of the user-interactive tasks that define pages in a multi-page image product before rendering one of the pages in the multi-page image product.

19. A method of rendering user-specified image products, comprising the steps of:

executing a plurality of user-interactive tasks relating to an image product, at least some of the user-interactive tasks specifying a portion of an image product;

computing a change probability of further changes to a portion of the image product specified by at least one of the plurality of user-interactive tasks;

if the change probability is below a predetermined threshold, rendering the portion of the image product corresponding to the at least one of the plurality of user-interactive tasks specifying a portion of the image product; and executing a single user-interactive task having a single change probability to define more than one page in a multi-page image product.

* * * * *